United States Patent
Chen

(10) Patent No.: US 10,683,057 B2
(45) Date of Patent: Jun. 16, 2020

(54) GUIDING BELT PULLEY FOR BICYCLE

(71) Applicant: DRIVETRAIN TECH SOLUTION INC., Taichung (TW)

(72) Inventor: Po Cheng Chen, Taichung (TW)

(73) Assignee: Drivetrain Tech Solution Inc., Taichung (TW)

(*) Notice: Subject to any disclaimer, the term of this patent is extended or adjusted under 35 U.S.C. 154(b) by 294 days.

(21) Appl. No.: 15/699,128

(22) Filed: Sep. 8, 2017

(65) Prior Publication Data

US 2019/0077486 A1    Mar. 14, 2019

(51) Int. Cl.
*B62M 9/02* (2006.01)
*F16H 7/02* (2006.01)
*F16H 7/18* (2006.01)

(52) U.S. Cl.
CPC ............. *B62M 9/02* (2013.01); *F16H 7/023* (2013.01); *F16H 7/18* (2013.01); *F16H 2007/185* (2013.01)

(58) Field of Classification Search
CPC .. B62M 9/02; F16H 7/18; F16H 7/023; F16H 2007/185
See application file for complete search history.

(56) References Cited

U.S. PATENT DOCUMENTS

| | | | | |
|---|---|---|---|---|
| 1,480,528 A * | 1/1924 | Morse | ....................... | F16H 7/06 |
| | | | | 474/157 |
| 3,387,437 A * | 6/1968 | Owen | ..................... | A01D 46/10 |
| | | | | 56/13.2 |
| 10,155,566 B2 * | 12/2018 | Sugimoto | ............... | B62M 9/105 |
| 10,309,515 B2 * | 6/2019 | Ohno | ......................... | B62M 9/10 |
| 2015/0152941 A1 * | 6/2015 | Sekiguchi | ................. | F16G 1/10 |
| | | | | 474/148 |
| 2016/0339995 A1 * | 11/2016 | Sugimoto | .............. | B62M 9/105 |

* cited by examiner

*Primary Examiner* — Michael R Mansen
*Assistant Examiner* — Juan J Campos, Jr
(74) *Attorney, Agent, or Firm* — Wang Law Firm, Inc.

(57) ABSTRACT

A guiding belt pulley, which is configured to engage a belt with belt teeth, includes a ring configuration having a root circle at an edge thereof and a plurality of pulley teeth projected from the root circle of the ring configuration, wherein each of the pulley teeth slants related to a radial line of the ring configuration. A shift gap and a move gap are left between each pair of the pulley teeth and the belt teeth to provide spaces for the deformed belt. It may reduce a risk of disengagement of the belt and provide a safe way of power transmission.

4 Claims, 8 Drawing Sheets

US 10,683,057 B2

GUIDING BELT PULLEY FOR BICYCLE

BACKGROUND OF THE INVENTION

1. Technical Field

The present invention relates to a bicycle, and more particularly to a guiding belt pulley for a bicycle.

2. Description of Related Art

As shown in FIG. 1, a conventional driving mechanism of a bicycle includes a belt pulley 90 with teeth 92 meshed with a belt 94 with teeth 96. The teeth 92 of the belt pulley 90 are complementary to a ring configuration 98 and pass through radial lines P of teeth 92. Therefore, two of the neighboring teeth 96 of the belt 94 are attached to opposite faces of the teeth 92 when the belt pulley 90 is meshed with the belt 94. A rider steps cranks to turn the belt pulley 90 so as to drive the belt.

The belt 94 is looped over two belt pulleys with a predetermined tension to have teeth 96 of the belt 94 firmly engaged with the teeth 92 of the belt pulleys 90. When a torque is transferred to the belt 94 from the belt pulley 90, a tension of the belt 94 at a top of the belt pulley 90 is greater than that of the belt 94 at a bottom of the belt pulley 90, so the belt 94 at the top of the belt pulley 90 will have a deformation greater than that at the bottom of the belt pulley 90, and this deformation may disengage the belt 94. Such disengagement will happen frequently when the bicycle is starting to go, or is climbing.

BRIEF SUMMARY OF THE INVENTION

In view of the above, the primary objective of the present invention is to provide a guiding belt pulley for a bicycle, which reduces a risk of disengagement of the belt when the belt is taken a large torque.

The secondary objective of the present invention is to provide a guiding belt pulley for a bicycle, which provides a high efficiency and safe torque transmission.

In order to achieve the objective of the present invention, a guiding belt pulley, which is configured to engage a belt with belt teeth, includes a ring configuration having a root circle at an edge thereof and a plurality of pulley teeth projected from the root circle of the ring configuration. Each of the pulley teeth has a first face, a second face, and a top land, wherein the first and the second faces are at opposite sides of the pulley tooth, and the top land is on a top of the pulley tooth and between the first and the second faces. A first curved face is formed between the first face and the top land, and a second curved face formed between the second face and the top land. The first face has a first root end, which connects to the root circle, and a first top end, which connecting to the top land. The first face has a length, which is a distance between the first root end and the first top end. The second face has a second root end, which connects to the root circle, and a second top end, which connecting to the top land. The second face has a length, which is a distance between the second root end and the second top end. Each of the pulley teeth slants related to a radial line of the ring configuration.

Since the pulley teeth are slanted, a shaft gap and a move gap are formed between the pulley teeth and the belt teeth when they are engaged. These two gaps may provide spaces for the belt teeth to deform and shift when taking a great torque to reduce a risk of disengagement of the belt.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
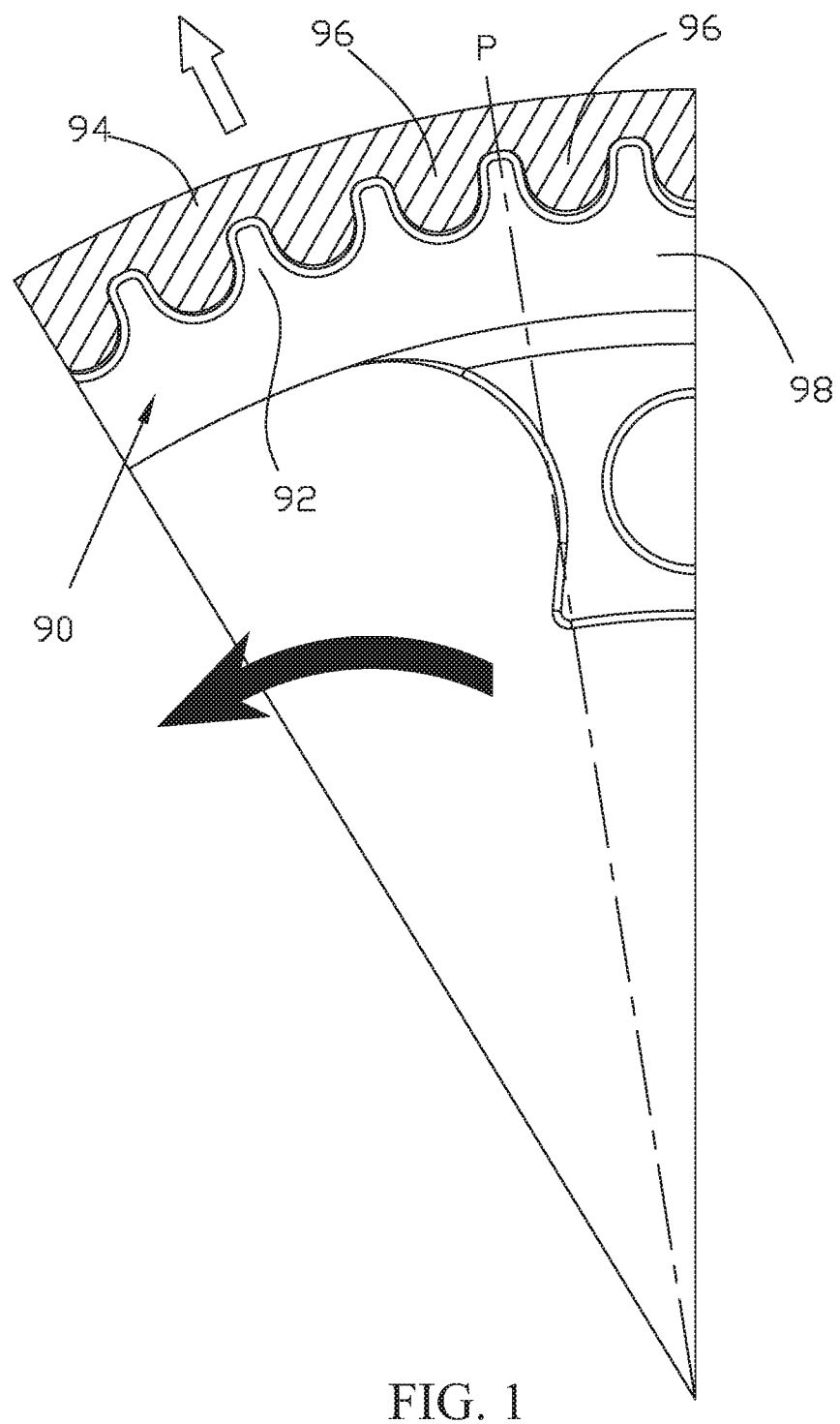
FIG. 1 is a sketch diagram of the engagement of the teeth of the conventional belt pulley and the conventional belt.
Figure 2:
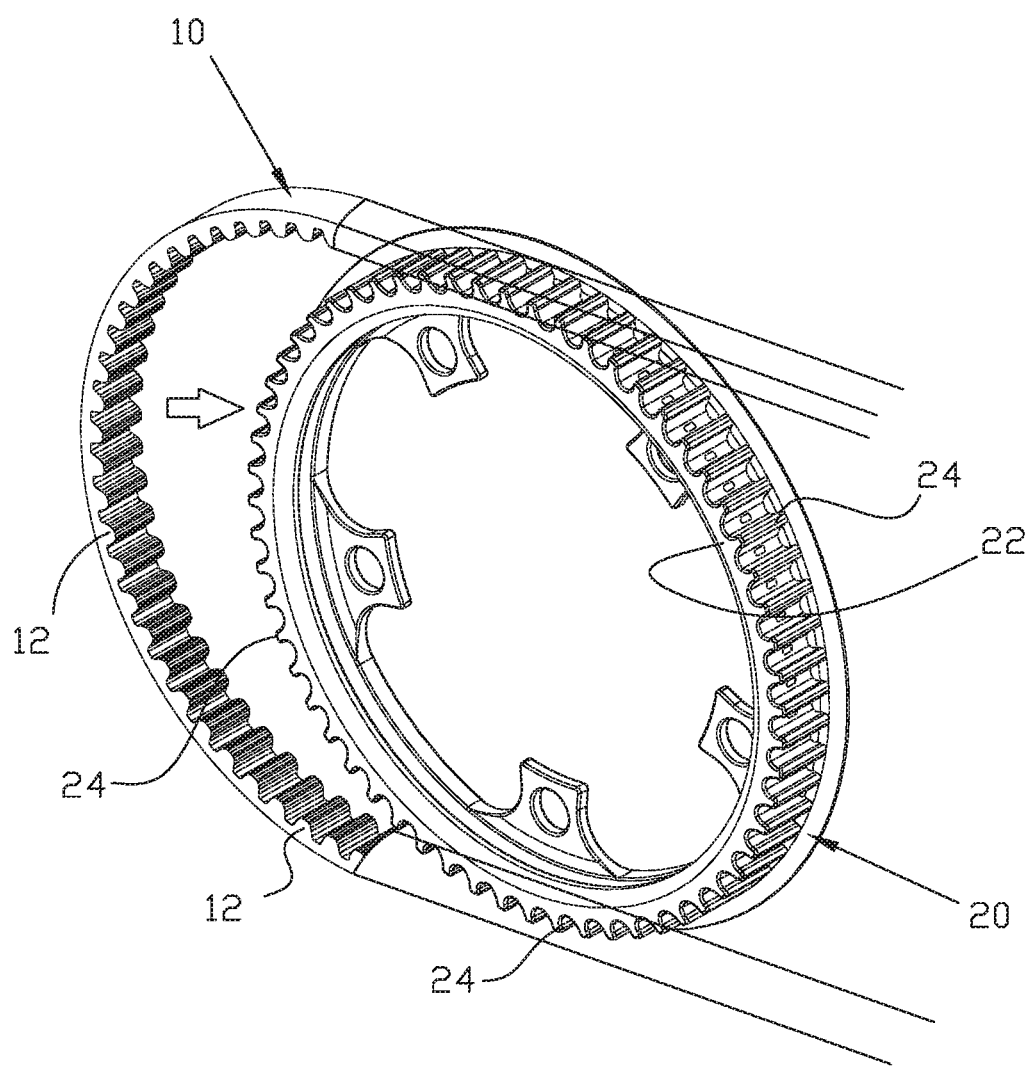
FIG. 2 is an exploded view of a preferred embodiment of the present invention.

FIG. 2 shows a belt 10 and a guiding belt pulley 20 of the preferred embodiment of the present invention. The belt 10 has a plurality of belt teeth 12 on an interior side thereof. The guiding belt pulley 20 has a ring configuration 22, on an edge of which a plurality of pulley teeth 24 are projected. The pulley teeth 24 of the guiding belt pulley 20 engage the belt teeth 12 of the belt 10 to transmit power. In an embodiment, the belt 10 and the guiding belt pulley 20 are configured to be applied in a bicycle.

Figure 3:
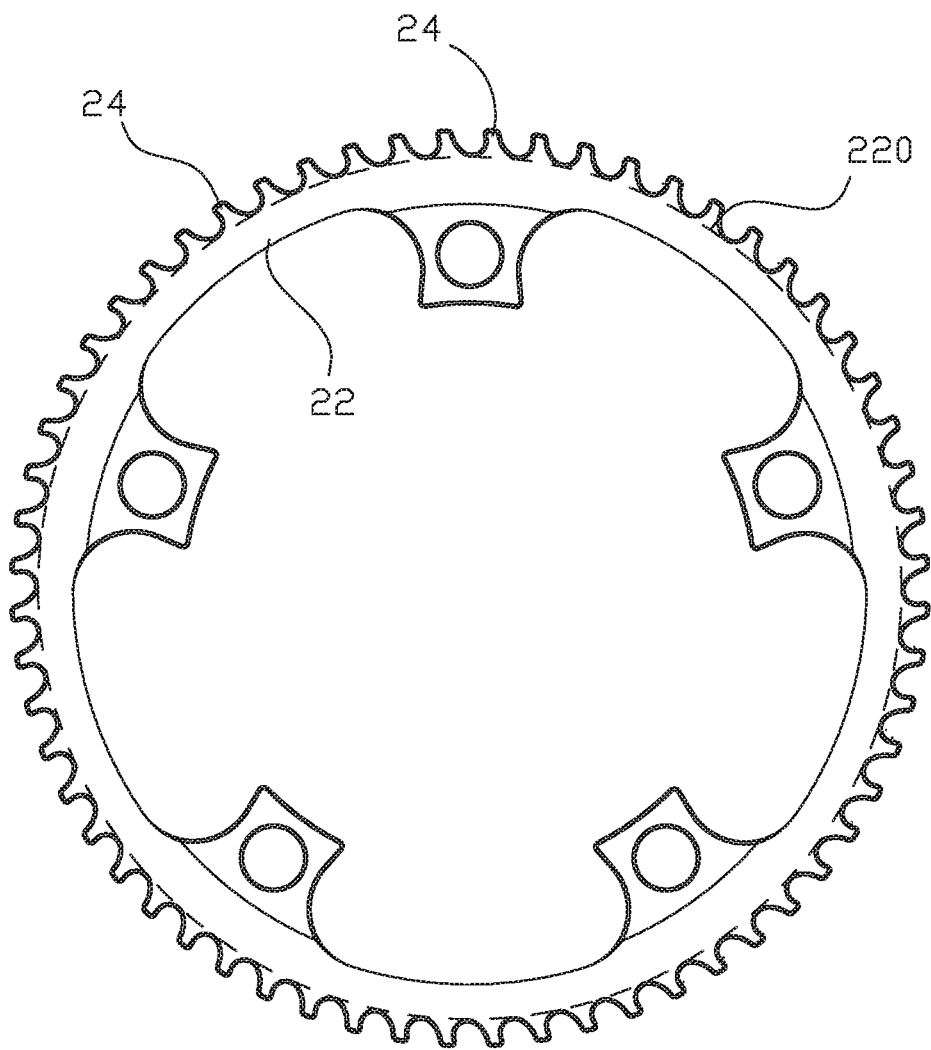
FIG. 3 is a front view of the belt pulley of the preferred embodiment of the present invention.

As shown on FIG. 3, the edge of the ring configuration 22 of the guiding belt pulley 20 is defined as a root circle 220, and the pulley teeth 24 are projected from the root circle 220.

Figure 4:
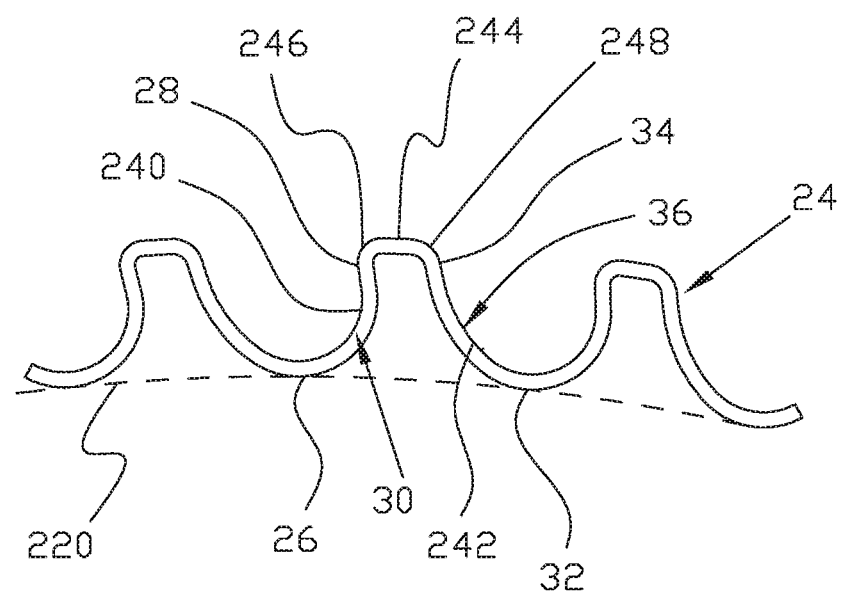
FIG. 4 is an enlarged view of the pulley teeth of the belt pulley of the preferred embodiment of the present invention.

As shown in FIG. 4, each of the pulley teeth 24 of the guiding belt pulley 20 has a first face 240, a second face 242, and a top land 244. The first and the second faces 240, 242 are at opposite sides of the pulley tooth 24, and the top land 244 is on a top of the pulley tooth 24 and between the first and the second faces 240, 242. Each pulley tooth 24 further has a first curved face 246 between the first face 240 and the top land 244, and a second curved face 248 between the second face 242 and the top land 244.

The first face 240 has a first root end 26, which connects to the root circle 220, and a first top end 28, which connecting to the top land 244. The first face 240 has a length 30, which is a distance between the first root end 26 and the first top end 28.

The second face 242 has a second root end 32, which connects to the root circle 220, and a second top end 34, which connecting to the top land 244. The second face 242 has a length 36, which is a distance between the second root end 32 and the second top end 34. The length 36 of the second face 242 is longer than the length 30 of the first face 240, and a radius of curvature of the second curved face 248 is greater than a radius of curvature of the first curved face 246. In an embodiment, a radius of curvature of the second curved face 248 is equal to a radius of curvature of the first curved face 246.

Figure 5:
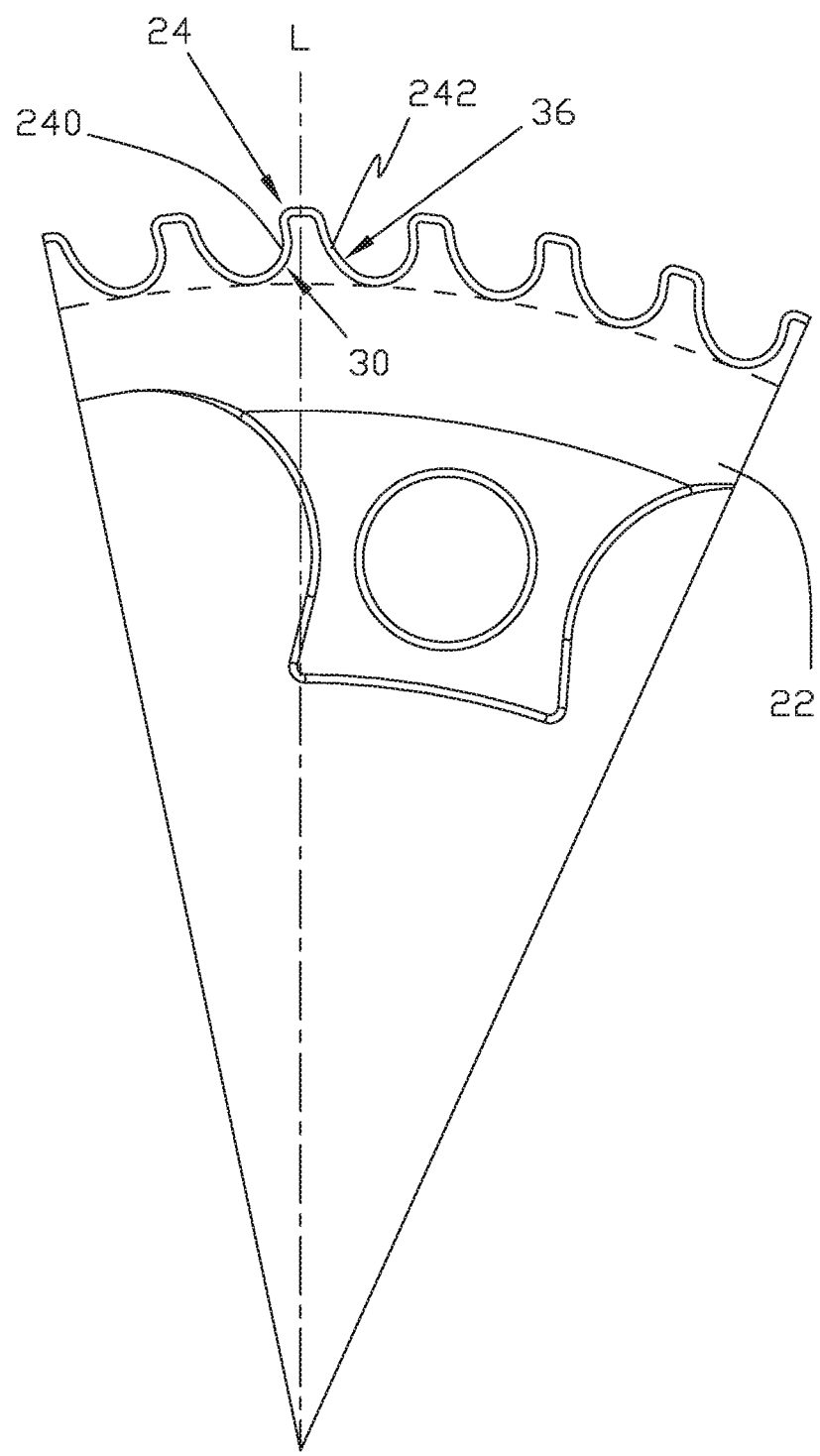
FIG. 5 is another enlarged view of the pulley teeth of the belt pulley of the preferred embodiment of the present invention.

As shown in FIG. 5, each of the pulley teeth 24 of the guiding belt pulley 20 has a radial line L, which passes a center of the guiding belt pulley 20, and first face 240 and the second face 242 are asymmetric related to the radial line L. Therefore, the pulley teeth 24 slant to the second faces 242 respectively.

Figure 6:
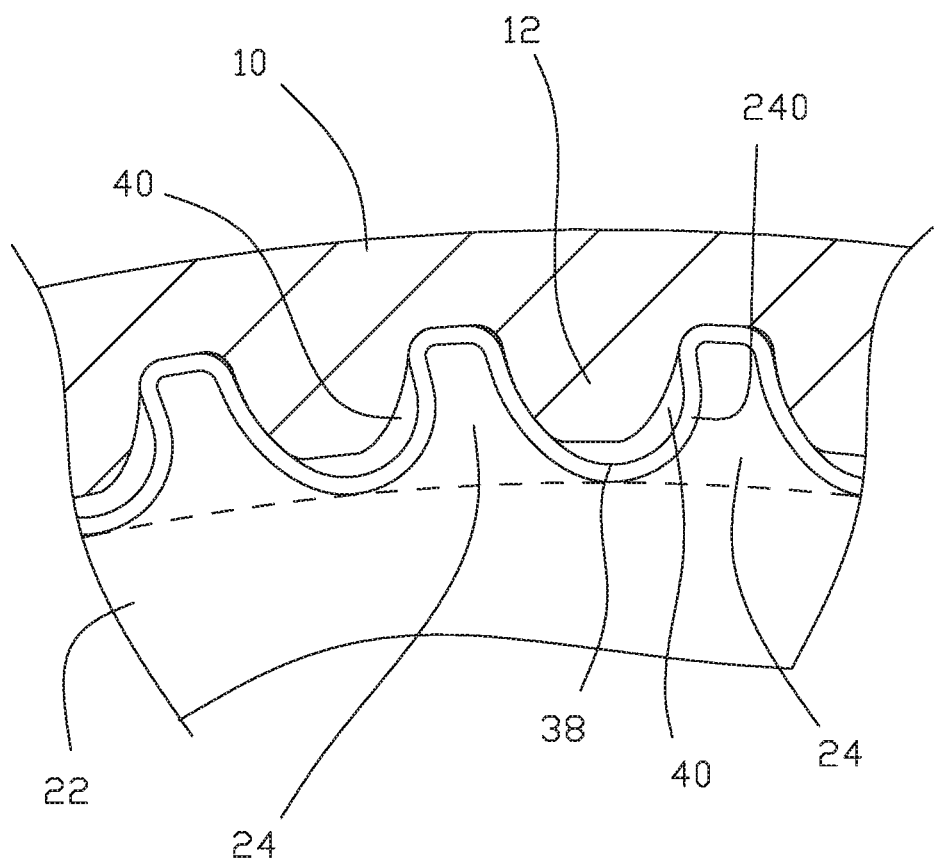
FIG. 6 is a partial sectional view of the preferred embodiment of the present invention.

As shown in FIG. 6, a groove 38 is formed between each two of the neighboring pulley teeth 24 to receive the belt tooth 12 of the belt 10. The grooves 38 are asymmetric and slanted related to the radial line L, so that a shift gap 40 is left between the belt tooth 12 and the first face 240 when the belt tooth 12 is received in the groove 38.

Figure 7:
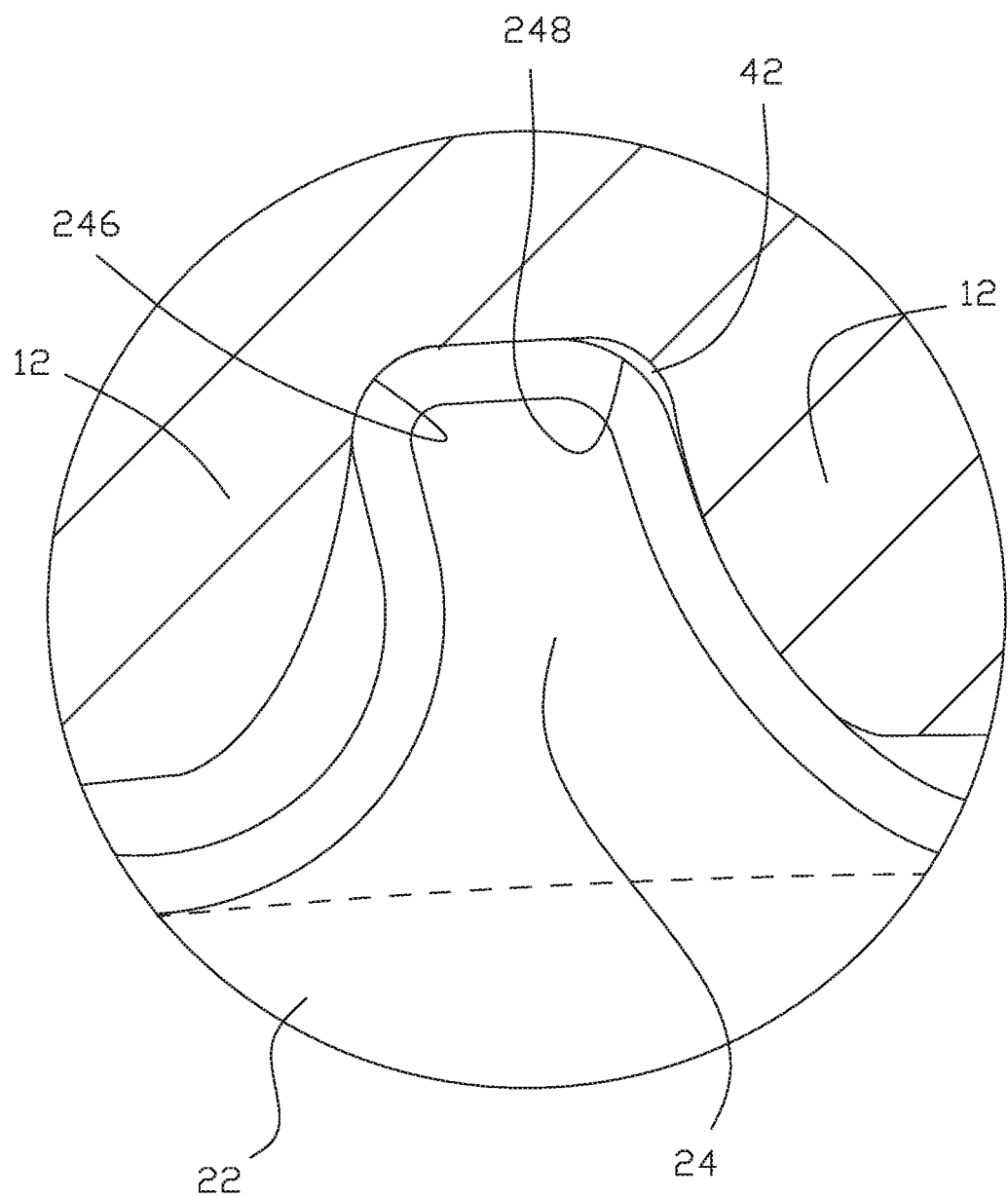
FIG. 7 is an enlarged view of the preferred embodiment of the present invention, showing the engagement of the pulley teeth of the belt pulley and of the belt teeth of the belt.

As shown in FIG. 7, with the structures of the pulley teeth 24 of the guiding belt pulley 20 as described above, the belt teeth 12 of the belt 10 are attached to the first curved faces 246 of the pulley teeth 24, and a move gap 42 is left between the second curved face 248 of the pulley tooth 24 and another belt tooth 12 of the belt 10.

Figure 8:
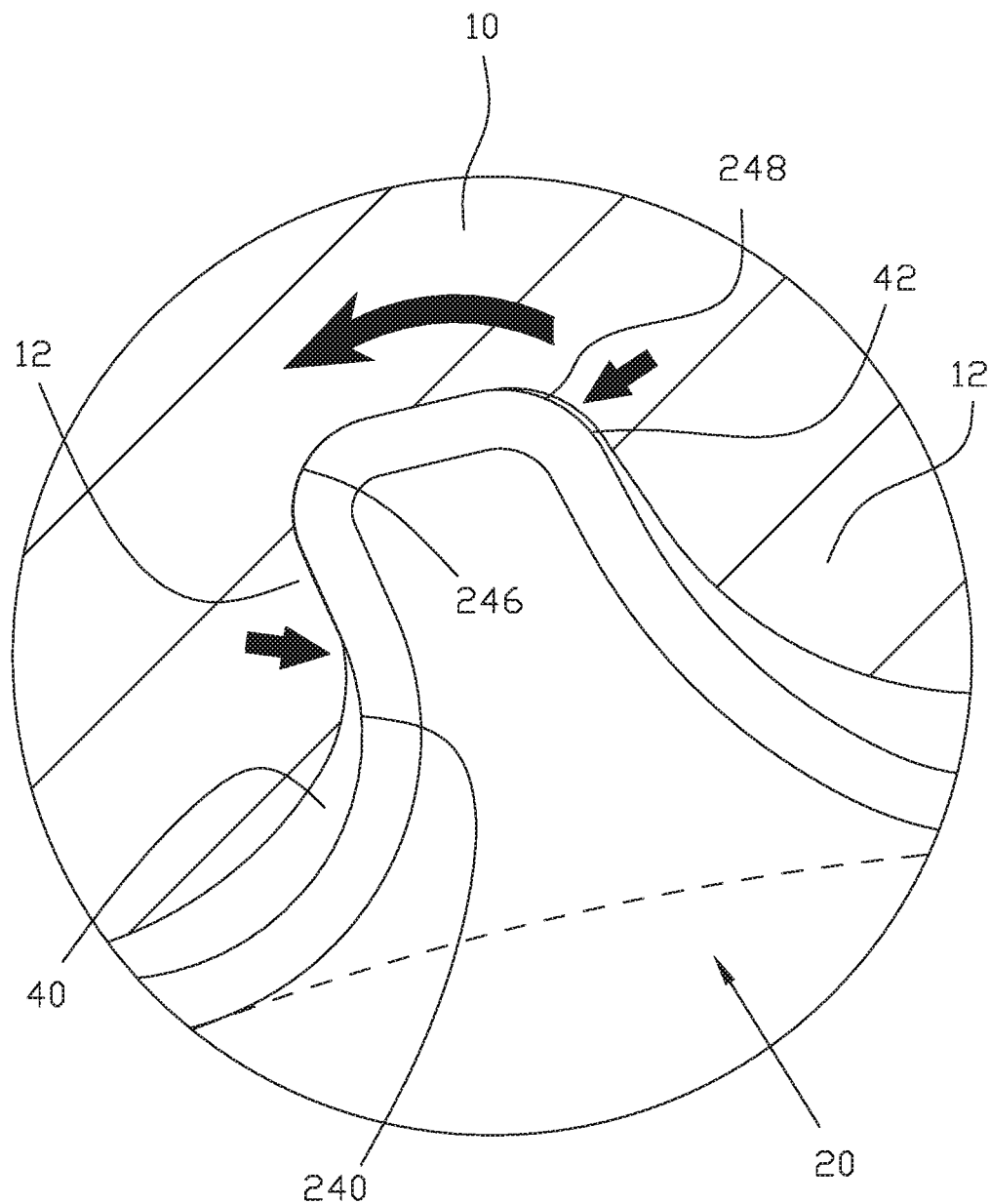
FIG. 8 is another enlarged view of the preferred embodiment of the present invention, showing the engagement of the pulley teeth of the belt pulley and of the belt teeth of the belt.

As shown in FIG. 8, when the guiding belt pulley 20 is turned, the first curved faces 246 of the pulley teeth 24 of the guiding belt pulley 20 press the belt teeth 12 of the belt 10 to drive the belt 10. When the guiding belt pulley 20 keeps turning, the belt teeth 12 may move toward the second curved faces 248 of the pulley teeth 24 through the move gap 42 between the second curved faces 248 of the pulley teeth 24 and the belt teeth 12 of the belt 10, and also move toward the first faces 240 through the shift gap 40 between the belt tooth 12 and the first face 240. In other words, the present invention provides the shift gap 40 and the move gap 42 to take a shift and a deformation of the belt tooth 12 of the belt 10. It may reduce a risk of disengagement of the belt 10 and the guiding belt pulley 20 when a large torque is transmitted. In other words, the present invention may allow a large torque transmission, and provide a safe way of power transmission.

It must be pointed out that the embodiments described above are only some preferred embodiments of the present invention. All equivalent structures which employ the concepts disclosed in this specification and the appended claims should fall within the scope of the present invention.

What is claimed is:

1. A guiding belt pulley, which is configured to engage a belt with belt teeth, comprising:
   a ring configuration having a root circle at an edge thereof; and
   a plurality of pulley teeth projected from the root circle of the ring configuration;
   wherein each of the pulley teeth has a first face, a second face, and a top land; the first and the second faces are at opposite sides of the pulley tooth, and the top land is on a top of the pulley tooth and between the first and the second faces; each of the pulley teeth further has a first curved face between the first face and the top land, and a second curved face between the second face and the top land; the first face has a first root end, which connects to the root circle, and a first top end, which connects to the top land; the first face has a length, which is a distance between the first root end and the first top end; the second face has a second root end, which connects to the root circle, and a second top end, which connects to the top land; the second face has a length, which is a distance between the second root end and the second top end;
   each of the pulley teeth slants related to a radial line of the ring configuration;
      wherein each of the first faces has a curved-inwards portion; the belt tooth covers the curved-inwards portion of the first face of the pulley tooth and a shift gap is always left between a surface of the curved-inwards portion and the belt tooth when the belt tooth engages the pulley tooth and the guiding belt pulley is not driven to turn;
      wherein the belt tooth is deformed and a deformed portion of the belt tooth enters the shift qap and touches the surface of the curved-inward portion when the belt tooth engages the pulley tooth and the guiding belt pulley is driven to turn to move the belt.

2. The guiding belt pulley of claim 1, wherein the length of the second face is longer than the length of the first face.

3. The guiding belt pulley of claim 1, wherein a radius of curvature of the second curved face is greater than a radius of curvature of the first curved face.

4. The guiding belt pulley of claim 1, wherein a radius of curvature of the second curved face is equal to a radius of curvature of the first curved face.

* * * * *